Dec. 5, 1933.    F. CARTLIDGE    1,937,547
SCREW THREAD DEVICE
Filed June 29, 1932
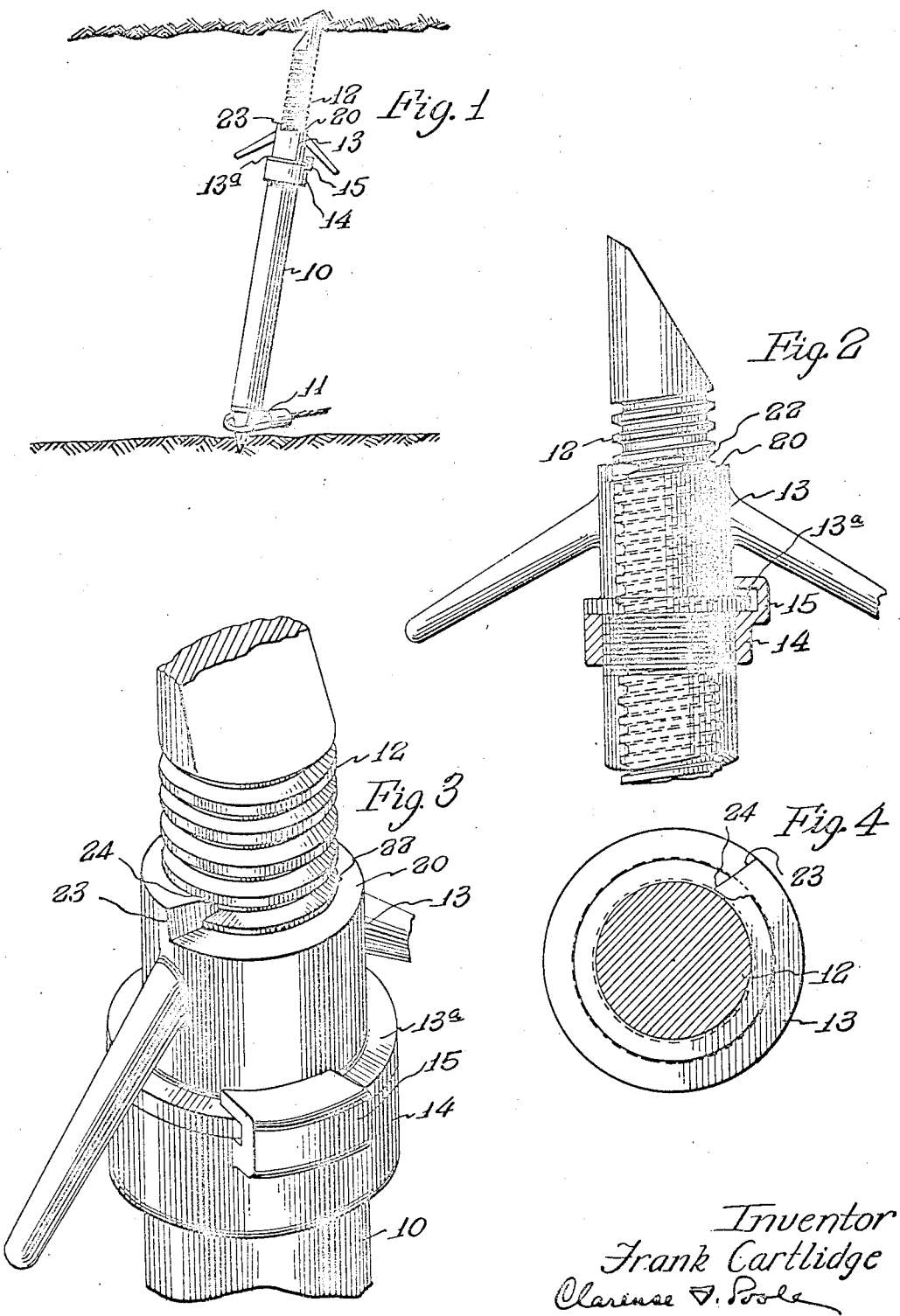
Inventor
Frank Cartlidge
Clarence D. Poole
Attorney Patented Dec. 5, 1933

1,937,547

UNITED STATES PATENT OFFICE 1,937,547

SCREW THREAD DEVICE

Frank Cartlidge, Chicago, Ill., assignor to Goodman Manufacturing Company, Chicago, Ill., a corporation of Illinois Application June 29, 1932. Serial No. 619,875

2 Claims. (Cl. 74—40)

This invention relates to improvements in screw thread devices, and has for its principal object to provide an improved means for cleaning the thread of dust, dirt, and other material which otherwise would tend to clog the threads and jam the nut against rotation.

As shown in the drawing, my invention is particularly adapted for use in mine jacks or in coal dust wherein dust and dirt is likely to lodge in the exposed threads of the jack and when mixed with lubricant becomes a gummy or caked mass which soon makes it difficult to turn the jack nut. In carrying out my invention, I provide the nut with an offset shoulder disposed at an oblique angle with the entering portion of the thread so as to clear the latter of objectionable material when the nut is rotated. I also form the adjacent end surfaces of the nut with a helical surface arranged with substantially the same pitch as that of the thread, and engaging said thread substantially along the top thereof so as to eliminate all jamming of material between the end of the nut and the adjacent groove of the thread.

The invention may best be understood by reference to the accompanying drawing wherein:

Figure 1 shows a mine jack constructed in accordance with my invention;

Figure 2 is an enlarged side view of the threaded end of the jack together with its wing nut having its exposed end constructed in accordance with my invention;

Figure 3 is an enlarged perspective view showing details of construction of the end surface of the nut; and Figure 4 is a transverse section taken through the threaded bolt immediately above the nut.

Referring to the details of the embodiment of my invention illustrated in the drawing, the mine jack to which it is applied consists of a pipe section 10 having a lower point 11 and an exteriorly threaded member 12 at the opposite end, a portion of which telescopes within the pipe section 10 and has an exteriorly threaded wing nut 13 thereon engaging a sleeve 14 fixed on the upper end of said pipe. In the form shown, the sleeve 14 has a projecting guide 15 integral therewith which spans a flange 13a carried on the lower end of the wing nut 13 so as to retain said nut adjacent the pipe 10 while permitting relative rotation thereof.

Referring now more particularly to the construction of the wing nut which forms the subject matter of my invention, it will be observed that an exposed end face 20 thereof is cut generally in a helically formed radially extending surface which follows substantially the same plane as the ridge or top of the adjacent cooperating thread 22 on the member 12. This upper surface is offset at one point to form an upright shoulder 23, the height of which substantially equals the pitch of the thread. The shoulder 23 is formed at an obtuse angle to the thread so as to form a cutting tip 24 which projects into the groove of the thread at a shearing angle. With this construction the cutting tip 24 is in advance of the interior threaded portion of the nut, and effectively clears dirt, gum, grease, or similar obstructions from both groove and top of the thread 22 when the nut is rotated outwardly relative to the member 12. At the same time the entire circumference of the thread where it enters the nut on both sides of the cutting tip 24 is effectively sealed and protected from ingress of dirt or other material. Furthermore, when the nut is unscrewed, there is no place for such material to become jammed between the groove of the thread and the adjacent end surfaces of the nut, provided, as in the form shown the pitch of the helical end surface 20 is not less than the pitch of the thread.

It will be understood, of course, that although I have shown and described my invention as applied to a mine jack, the same principle may be employed in a wide variety of other threaded devices. I do not, therefore, wish to be understood as limited to the specific embodiment herein disclosed, nor to the specific form and arrangement of the thread clearing construction herein illustrated and described, excepting insofar as limited by the appended claims.

I claim as my invention:

1. In combination with an exteriorly threaded member, an interiorly threaded nut having an end face formed with a continuous helical surface meeting the entering portion of the thread along a line which substantially follows the pitch of said thread, and having an offset shoulder formed with a projecting tip extending into the groove of said exterior thread at a cutting angle.

2. In combination with an exteriorly threaded member, an interiorly threaded nut having an end face offset longitudinally to form a shoulder having a portion thereof extending into the groove of said exterior thread at a cutting angle, and the remaining portions of said end face being formed on a helical surface substantially following the pitch of said exterior thread.

FRANK CARTLIDGE.